Feb. 3. 1925. 1,525,061
J. V. BLOMQUIST ET AL
APPARATUS FOR INDICATING THE DEPTH OF A CENTRIFUGALLY POSITIONED
LAYER OF WATER IN A CYLINDER
Filed Feb. 26, 1923 3 Sheets-Sheet 1

Inventors
J. V. Blomquist
K. F. Wessblad
by Langner, Parry, Card + Langner
Attys.

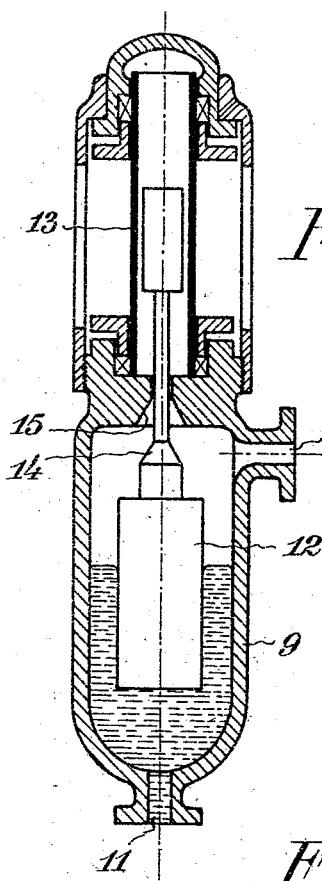
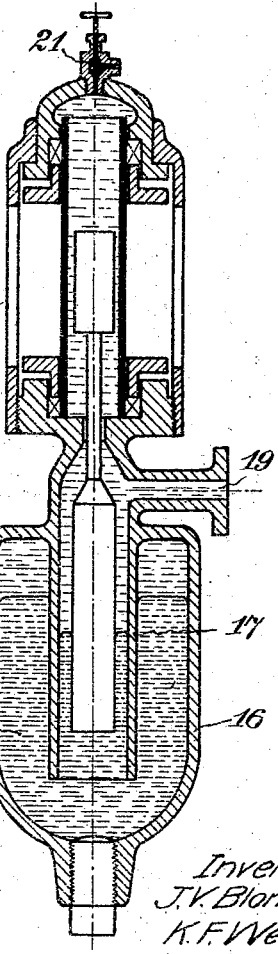

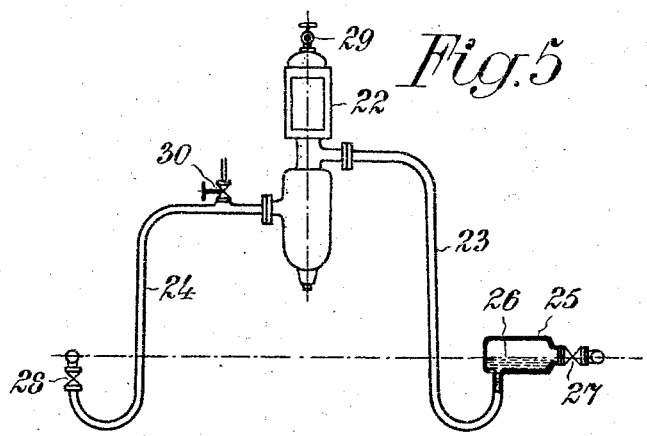
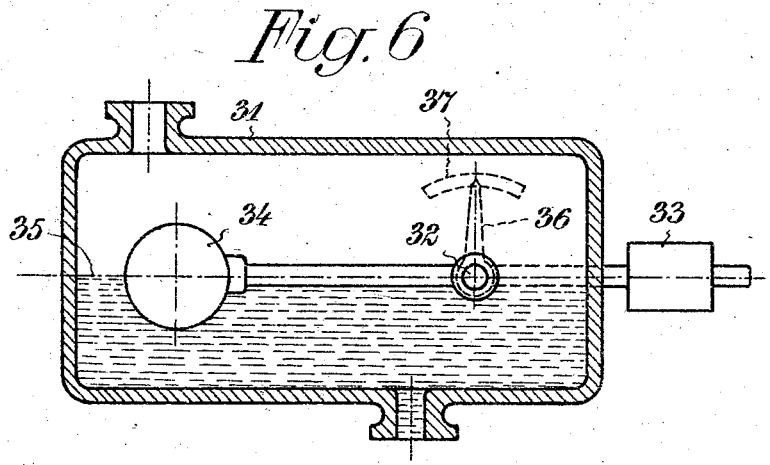
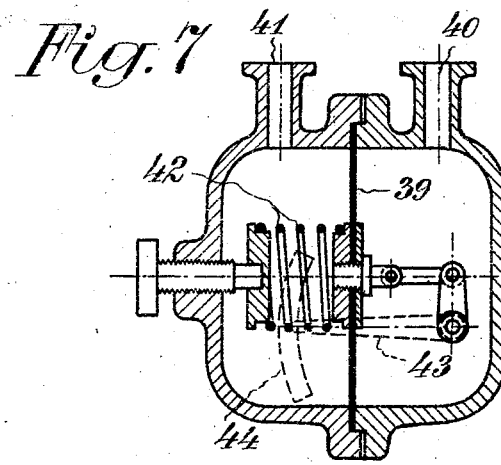

Patented Feb. 3, 1925.

1,525,061

UNITED STATES PATENT OFFICE.

JOHAN VIKTOR BLOMQUIST AND KARL FREDRIK WESSBLAD, OF STOCKHOLM, SWEDEN.

APPARATUS FOR INDICATING THE DEPTH OF A CENTRIFUGALLY-POSITIONED LAYER OF WATER IN A CYLINDER.

Application filed February 26, 1923. Serial No. 621,393.

*To all whom it may concern:*

Be it known that we, JOHAN VIKTOR BLOMQUIST and KARL FREDRIK WESSBLAD, both citizens of Sweden, and residing at Stockholm, Sweden, have invented certain new and useful Improvements in Apparatus for Indicating the Depth of a Centrifugally-Positioned Layer of Water in a Cylinder, of which the following is a specification.

The present invention relates to an apparatus for reading off the thickness of the layer of water in steam generators consisting of rotary tubular elements or of non-rotary elements with rotary layers of water. The invention is based upon the utilization of the difference of pressure arising between the water and the steam in the rotary tubular element on account of the centrifugal force during the rotation. If for instance a pipe bent in an arbitrary angle is rotating around one of its branches which latter communicates with a vessel filled with water, the water, as is well known, will be ejected through the other branch of the pipe. Thus a suction arises in the water in the branch forming the axis of rotation, which suction will be increased according as the centrifugal force of the water in the other branch is increased. This principle, on which the invention is based, is utilized in such a way that the difference of pressure between the water and the steam caused by the centrifugal force is made to act upon a surface of water or some other liquid, and that variations of the level of this surface caused by the centrifugal force at different thicknesses of the layer of water may be read off either by a gauge-glass, a float gauge, a diaphragm arrangement or the like.

The invention is illustrated in the accompanying drawings in which:

Fig. 3 is a section of another modification showing a float in a lower vessel and an indicating device in an upper vessel.

Fig. 4 is a section of still another modification which forms a combination of the forms illustrated in Figs. 2 and 3.

Fig. 5 shows the invention as applied to a gage shown in Fig. 4 when the gage for any reason must be arranged above the steam and water journals, and includes a special water level controlling device shown in section.

Fig. 6 is a section of a form of a water gage similar to that shown in Fig. 1 with the difference that a float is arranged rotatably on an axis to which an external pointer is fitted.

Fig. 7 is a section of a further modification of the water gage comprising a diaphragm.

Figure 1:
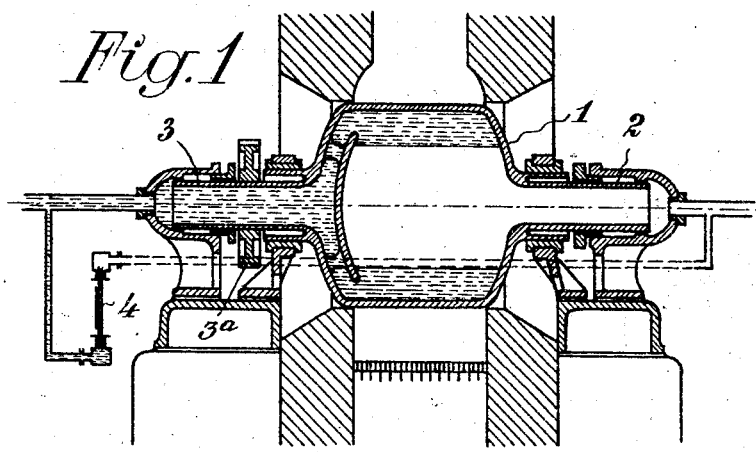
Figure 1 is a section of a rotary tubular boiler element of a steam generator in connection with a water gage.

According to Fig. 1, showing a form including a gauge glass with a varying water level, 1 is the rotary boiler element. 2 indicates one of its hollow journals serving as steam outlet. 4 is an ordinary water-gauge at the top connected with the steam journal 2 and at the bottom with the water journal 3. By the difference of pressure arising between the water and the steam on account of the centrifugal force during the rotation by gear 3ª for example, of the tubular boiler element at constant speed the water level in the water-gauge will vary according to the thickness of the layer of water in the rotary tubular element, and thus said thickness can be read off on a scale carried by the gauge-glass.

Figure 2:
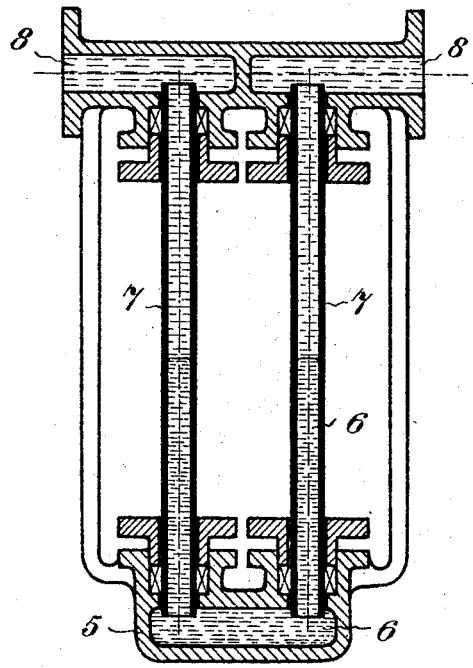
Fig. 2 is a section of a modification of a water gage to be used in connection with a rotary element and comprising two parallel gage pipes.

Fig. 2 shows another form of the invention to be adapted to a rotary tubular element according to Fig. 1. In order to avoid the inconveniences adherent to the form shown in Fig. 1 on account of the gauge-glass 4 partly being filled with steam of high temperature, which necessitates the use of gauge-glasses of a higher quality, the glass according to Fig. 2 is placed in such a way that it is always filled with cold water. The vessel 5 contains a liquid 6 heavier than water, such as mercury. In the pipes 7, one or both of which consists of glass, the surfaces of the liquid reach to a certain height, and above the liquid the pipes are filled with cold water. At 8 the pipes are connected with the steam and water journals respectively of the rotary tubular element by means of piping filled with water, and thus the thickness of the water layer in the rotary element may be read off on a scale provided at the gauge-glass or glasses.

Fig. 3 shows a third form of the invention also intended to be used in connection with a rotary element as indicated in Fig. 1. The vessel 9 is at its upper part at 10 connected with the steam journal of the tubular boiler element and at its lower part at 11 with the water journal. On the surface of the water in the vessel a float 12 is arranged, the upper part of which slides in a glass tube 13. A variation of the thickness of the layer of water in the rotary boiler element causes a change of the water level and of the position of the float. The movements of the latter may be read off on a scale at the glass tube surrounding the float. The water-gauge may of course in a usual manner be provided with necessary gauge-cocks. The float 12 is on its middle part formed into a valve 14. In case of a fracture of the gauge-glass the water level in the vessel 9 is raised and also the float, whereby the valve 14 will be pressed against a valve seat 15, thus effecting an automatic closing of the gauge-glass. This device serves the same purpose as the usual ball valves and the like in other water-gauges, but while two valves are necessary in such known devices, i. e. one at each end of the gauge-glass only one valve is needed according to the present invention.

Fig. 4 shows a combination of the forms illustrated in Figs. 2 and 3. The vessel 16 is partly filled with a liquid heavier than water, such as mercury. By means of a pipe 17 the vessel is divided into an inner chamber communicating with the steam journal at 19 and an outer chamber communicating with the water journal at 20. The horizontal cross-section of the outer chamber is preferably larger than that of the inner one, whereby a greater range of variation of the liquid level in the inner one is obtained. On the liquid and in the inner chamber the float described in connection with Fig. 4, with its valve and the surrounding glass tube and scale is arranged. Preferably the whole water-gauge is placed so low that its highest part is situated lower than the steam and water journals of the rotary boiler element, whereby the filling of the former is facilitated. The water-gauge is preferably at its top provided with an air cock 21 for letting out of air.

Fig. 5 shows a form of the invention to be used in such cases when for some reason the water-gauge shown in Fig. 4 cannot be placed lower than the steam and water journals, but must be arranged above said journals. The water-gauge 22 is then connected with the steam journal by the pipe 23 and with the water journal by the pipe 24, and in this case these journals are arranged lower than the water-gauge. At the steam journal a horizontal portion 25 is arranged of such an extension that the water level 26 of the same will be made subject to no appreciable variations at the variations of the thickness of the layer of water in the rotary boiler element. At the steam and water journals stop valves 27 and 28 are provided and after closing the same water can be introduced into the water gauge through the combined charging and air cocks 29 and 30. By bending the pipes 23 and 24 down under the steam and water journals the water is prevented from falling from the water-gauge when the rotation of the steam generator is stopped, as the air cannot pass down through these bends filled with water.

Fig. 6 shows a form similar to the one illustrated in Fig. 1 but with the difference that while the variations of the water level in the form shown in Fig. 1 are observed through a glass tube, according to Fig. 6 a float is used that is made to turn on an axis in such a way that the variations of the water level are indicated by an external pointer. In a vessel 31, which at the top communicates with the steam journal and at the bottom with the water journal, a float 34 is mounted on a spindle 32 and if necessary balanced by a counterweight 33 in such a way that it floats on the surface 35 of the water. A pointer 36 is carried by the spindle 32 and indicates the thickness of the layer of water on a dial 37.

Fig. 7 shows a form of the invention containing a diaphragm. In the vessel 38 a diaphragm 39 is provided. On one side of the diaphragm the vessel at 40 is connected with the steam-journal of the rotary boiler member by means of piping filled with water, and on the other side at 41 with the water journal. A spring 42 adjustable from the outside may preferably be connected with the diaphragm. At different water levels in the rotary tubular member the diaphragm will then be deflected in a corresponding degree, and these deflexions may be read off on a dial 44 by means of a pointer 43. This form of the invention can also be arranged above the steam and water journals in the manner shown in Fig. 5.

The different Figs. 1–7 show the invention applied to steam generators having rotary tubular elements, but it is to be understood that the invention in quite the same manner may be applied to steam generators having non-rotating tubular elements with a rotating layer of water.

We claim:—

1. An apparatus for determining the thickness of a rotating layer of water centrifugally positioned within a cylindrical element so as to leave a free space at the central part of said element, comprising said element, a differential pressure gage, means connecting the free space in said element with the high pressure space of the gage and means connecting the low pressure space of the gage with the water space of the element at a point in the latter which is subject to the pressure due to the thickness of the layer of water to be measured, whereby the differential pressure indicated by the gage will be proportional to such thickness and will thus show the thickness of the rotating layer of water.

2. An apparatus for determining the thickness of a rotating layer of water centrifugally positioned within a cylindrical element so as to leave a free steam space at the central part of the element, comprising said element, a differential pressure gage having a liquid medium therein and so shaped that it, together with the liquid medium therein, coact to form a U-tube pressure gage, means connecting the steam space with the high pressure space of the gage, means connecting the low pressure space of the gage with the water space of the tubular element at a point in the latter which is subject to the combined pressure due to the steam and to the thickness of the layer of water to be measured, whereby the differential pressure indicated by the gage is proportional to the thickness of the rotating layer of water within the element.

3. An apparatus for determining the thickness of a rotating layer of water centrifugally positioned within a cylindrical element so as to leave a free steam space at the central part of the element, comprising said element, a differential pressure gage having a liquid medium therein and so shaped that it, together with the liquid medium therein, coact to form a U-tube pressure gage, a float carried by the liquid medium, a hollow transparent extension carried by the gage and in communication therewith through an opening connecting the gage with the extension, an indicating means connected with the float and extending through the opening and within the transparent extension, means connecting the steam space with the high pressure space of the gage, means connecting the low pressure space of the gage with the water space of the tubular element at a point in the latter which is subject to the combined pressure due to the steam and to the thickness of the layer of water to be measured, whereby the differential pressure indicated by the gage is proportional to the thickness of the rotating layer of water within the element.

4. An apparatus of the character described, comprising a steam generator including a revoluble tubular element adapted to centrifugally position a layer of water therein so as to leave a free steam space at the central part of the element, a differential pressure gage, means connecting the steam space with the high pressure space of the gage, means connecting the low pressure space of the gage with the water space of the tubular element at a point in the latter which is subject to the pressure due to the thickness of the layer of water to be measured, whereby the differential pressure indicated by the gage is proportional to the thickness of the rotating layer of water within the element.

In testimony whereof, we have signed our names to this specification in the presence of subscribing witnesses.

JOHAN VIKTOR BLOMQUIST.

Witnesses as to signature of Johan Viktor Blomquist:
  E. HOLZERMAN,
  FRED HERAN.

KARL FREDRIK WESSBLAD.

Witnesses as to signature of Karl Fredrik Wessblad:
  M. MARKENSSON,
  TUSTEN HORNEN.